(12) United States Patent
Legge

(10) Patent No.: US 7,160,071 B2
(45) Date of Patent: Jan. 9, 2007

(54) TRUCK BED DIVIDER APPARATUS

(76) Inventor: Steven B. Legge, 380 Pleasant St., Franklin, MA (US) 02038

( * ) Notice: Subject to any disclaimer, the term of this patent is extended or adjusted under 35 U.S.C. 154(b) by 0 days.

(21) Appl. No.: 10/848,211

(22) Filed: May 18, 2004

(65) Prior Publication Data

US 2004/0232726 A1 Nov. 25, 2004

Related U.S. Application Data

(60) Provisional application No. 60/471,532, filed on May 19, 2003.

(51) Int. Cl.
*B60P 7/08* (2006.01)
(52) U.S. Cl. ............... 410/140; 410/121; 410/129
(58) Field of Classification Search ............ 410/121, 410/129, 131, 135, 140, 141; 224/403, 404, 224/42.34; 296/24.4, 50, 55; 220/531, 557
See application file for complete search history.

(56) References Cited

U.S. PATENT DOCUMENTS

| | | | |
|---|---|---|---|
| 5,037,152 A | 8/1991 | Hendricks | |
| 5,478,130 A | 12/1995 | Matulin et al. | |
| 5,800,145 A * | 9/1998 | Kelce | 410/142 |
| 5,911,464 A | 6/1999 | White | |
| 5,975,819 A * | 11/1999 | Cola | 410/129 |
| 6,017,175 A * | 1/2000 | Kassab et al. | 410/131 |
| 6,425,618 B1 | 7/2002 | Garland et al. | |
| 6,513,850 B1 | 2/2003 | Reed | |
| 6,524,043 B1 * | 2/2003 | Earle et al. | 410/130 |
| 6,626,478 B1 * | 9/2003 | Minton | |

* cited by examiner

Primary Examiner—Stephen Gordon

(57) ABSTRACT

A truck bed divider apparatus includes a first side frame member, a second side frame member, and side-frame-to-side-frame spacing means connected between the first side frame member and the second side frame member. A pair of partition gates are hingedly connected between the first side frame member and the second side frame member. The partition gates prevent items carried on the truck bed from moving toward the front of the truck bed away from the tailgate. With one embodiment, the respective side frame members are fastened to walls of the truck bed, and respective partition gate are nested within the respective side frame members when the partition gates are not in use. The apparatus of the invention permits positioning of items carried on the truck bed near the end of the bed, near the tailgate, so that the items are easier to reach from the tailgate end of the bed.

3 Claims, 7 Drawing Sheets

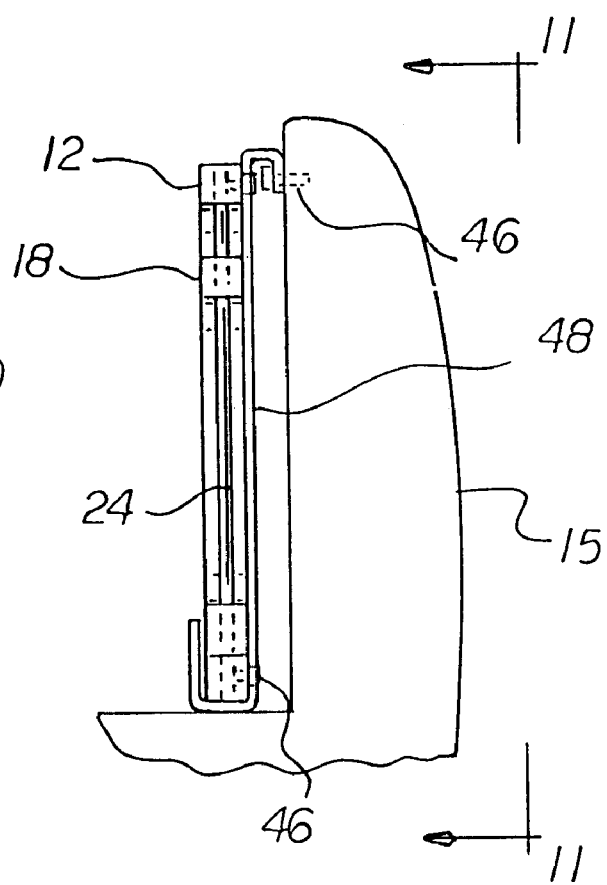
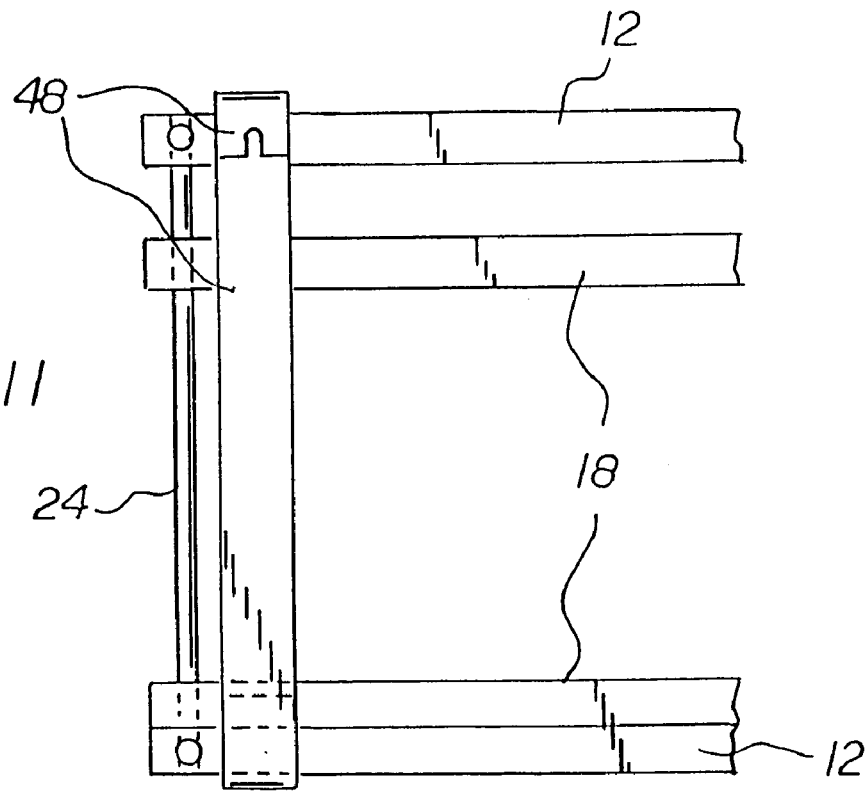

TRUCK BED DIVIDER APPARATUS

CROSS-REFERENCE TO RELATED APPLICATION

This application claims priority based upon my copending Provisional Application Ser. No. 60/471,532; filed May 19, 2003.

BACKGROUND OF THE INVENTION

1. Field of the Invention

The present invention relates generally to truck beds, and, more particularly, to devices especially adapted for dividing truck beds into separated bed areas.

2. Description of the Prior Art

It is well known in the art of truck beds, especially beds of pickup trucks, to attempt to maximize space utilization for the truck beds. With this in mind, throughout the years, a number of innovations have been developed relating to utilizing the space of pickup truck beds, and the following U.S. patents are representative of some of those innovations: 5,037,152, 5,478,130, 5,911,464, 6,425,618, and 6,513,850. More specifically, U.S. Pat. No. 5,037,152 discloses a truck rack which permits the vertical space above the truck bed to be used to greater effect. However, this rack does not provide for optimum utilization of the space on the truck bed surface. In this respect, it would be desirable if a device were provided that helps optimize utilization of floor space on a truck bed surface.

Each of U.S. Pat. Nos. 5,478,130, 5,911,464, 6,425,618, and 6,513,850 discloses a device which serves to extend the useful length of a truck bed. Yet, none of these patents discloses a device which serves to optimize the already existing floor space on a truck bed surface. In this respect, it would be desirable if a device were provided which helps optimize utilization of the already existing floor space on a truck bed surface.

Still other features would be desirable in a truck bed divider apparatus. There are times when it may be desirable if the existing floor space on a truck bed surface could be divided into separate areas. Also, there are times when it is desirable to utilize the full truck bed surface as one single area. In this respect, it would be desirable if a device were provided that enabled rapid partitioning of the truck bed surface into separated areas and that permitted rapid return to use of the full truck bed surface as one single area.

Since conventional truck beds do not currently have convenient means for rapid transitioning from a single truck bed surface area to a truck bed surface area that is divided into separate surface areas, and vice versa, it would be desirable if a device were provided which permits rapid retrofitting of a conventional truck bed to one that permits rapid transitioning from a single truck bed surface area to a truck bed surface area that is divided into separate surface areas.

At times it may be desirable to completely remove a truck bed dividing device from the truck bed. In this respect, it would be desirable if a truck bed dividing device were provided that is easily removed from the truck bed. Moreover, for a truck bed divider device that is easily removed from the truck bed, it would be desirable if installation of the device did not require drilling holes or otherwise permanently damaging the walls adjacent to the truck bed. At other times, it may be desirable to retain a truck bed divider device adjacent to the truck bed, but folded off of the truck bed. Then, when the truck bed divider device is needed in the future, the truck bed divider device can be readily reinstalled for dividing the truck bed into separated areas. In this respect, it would be desirable if a truck bed divider device were provided which permits easy folding up of the device when not needed and easy unfolding of the device when needed.

Thus, while the foregoing body of prior art indicates it to be well known to use devices to improve utilization of a truck bed, the prior art described above does not teach or suggest a truck bed divider apparatus which has the following combination of desirable features: (1) helps optimize utilization of floor space on a truck bed surface; (2) helps optimize utilization of the already existing floor space on a truck bed surface; (3) can be used to divide existing floor space on a truck bed surface into separate areas; (4) enables rapid partitioning of the truck bed surface into separated areas and permits rapid return to use of the full truck bed surface as one single area; (5) permits rapid retrofitting of a conventional truck bed to one that permits rapid transitioning from a single truck bed surface area to a truck bed surface area that is divided into separated surface areas; (6) can be easily removed from a truck bed; (7) does not require drilling holes or otherwise permanently damaging the walls adjacent to the truck bed for installation of the device; and (8) permits easy folding up of the device when not needed and easy unfolding of the device when needed. The foregoing desired characteristics are provided by the unique truck bed divider apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a truck bed divider apparatus which includes a first side frame member which is connected to a first wall of a truck bed and a second side frame member which is connected to a second wall of the truck bed. Side-frame-to-side-frame spacing means are connected to the first side frame member and the second side frame member, for spacing the first side frame member and the second side frame member transversely apart from each other. Transverse hinged partition means are connected between the first side frame member and the second side frame member, wherein each of the first side frame member and the second side frame member includes partition-reception means. Preferably, the transverse hinged partition means include a first partition gate hingedly connected to the first side frame member and a second partition gate hingedly connected to the second side frame member.

Gate-to-gate locking means can be provided for locking the first partition gate and the second partition gate together in a transverse partitioning orientation. The gate-to-gate locking means include latch links is connected between inside ends of the first partition gate and the second partition gate. The latch links are hingedly is connected to the first partition gate, and the second partition gate includes latch-reception fingers for engaging the latch links. The partition-reception means include hinge support flanges and gate-to-side hinges received in the hinge support flanges. The gate-to-side hinges includes biasing springs. The partition-reception means can be arrayed along the respective side frame members at a plurality of partition-reception locations.

With one embodiment of the invention, the side-frame-to-side-frame spacing means include a transverse strut member is connected between the first side frame member and the second side frame member.

With another embodiment of the invention, the side-frame-to-side-frame spacing means include bed-wall-to-side-frame connector means are connected between the respective side frame members and side walls of the truck bed. The bed-wall-to-side-frame connector means include fasteners connected between the respective side frame members and walls of the truck bed.

Also, side-frame-to-bed-wall brackets can be connected between the respective side frame members and the walls of the truck bed.

Each of the respective first side frame member and the second side frame member includes a respective inside distal length and an inside width. Also, each of the respective first partition gate and the second partition gate includes a respective outside distal length and an outside width.

Preferably, the inside distal length is greater than the outside distal length, and the inside width is greater than the outside width, whereby the respective partition gates are nested with the respective side frame members when the partition gates are folded against walls of the truck bed.

In addition, a partition panel can be attached to a partition gate, and panel-to-partition fasteners are employed for attaching a partition panel to a partition gate.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck bed divider apparatus which has all of the advantages of the prior art and none of the disadvantages.

It is another object of the present invention to provide a new and improved truck bed divider apparatus which may be easily and efficiently manufactured and marketed.

It is a further object of the present invention to provide a new and improved truck bed divider apparatus which is of durable and reliable construction.

An even further object of the present invention is to provide a new and improved truck bed divider apparatus which is susceptible of a low cost of manufacture with regard to both materials and labor, and which accordingly is then susceptible of low prices of sale to the consuming public, thereby making such truck bed divider apparatus available to the buying public.

Still yet a further object of the present invention is to provide a new and improved truck bed divider apparatus which helps optimize utilization of floor space on a truck bed surface.

Still another object of the present invention is to provide a new and improved truck bed divider apparatus that helps optimize utilization of the already existing floor space on a truck bed surface.

Yet another object of the present invention is to provide a new and improved truck bed divider apparatus which can be used to divide existing floor space on a truck bed surface into separate areas.

Even another object of the present invention is to provide a new and improved truck bed divider apparatus that enables rapid partitioning of the truck bed surface into separated areas and permits rapid return to use of the full truck bed surface as one single area.

Still a further object of the present invention is to provide a new and improved truck bed divider apparatus which permits rapid retrofitting of a conventional truck bed to one that permits rapid transitioning from a single truck bed surface area to a truck bed surface area that is divided into separated surface areas.

Yet another object of the present invention is to provide a new and improved truck bed divider apparatus that can be easily removed from a truck bed.

Still another object of the present invention is to provide a new and improved truck bed divider apparatus which does not require drilling holes or otherwise permanently damaging the walls adjacent to the truck bed for installation of the device.

Yet another object of the present invention is to provide a new and improved truck bed divider apparatus that permits easy folding up of the device when not needed and easy unfolding of the device when needed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 10 is a front view of embodiment of the invention shown in FIG. 8, taken along line 10—10 thereof.

FIG. 11 is a side view of the embodiment of the invention shown in FIG. 10, removed from the first wall of the truck bed.

DESCRIPTION OF THE PREFERRED EMBODIMENT

Figure 1:
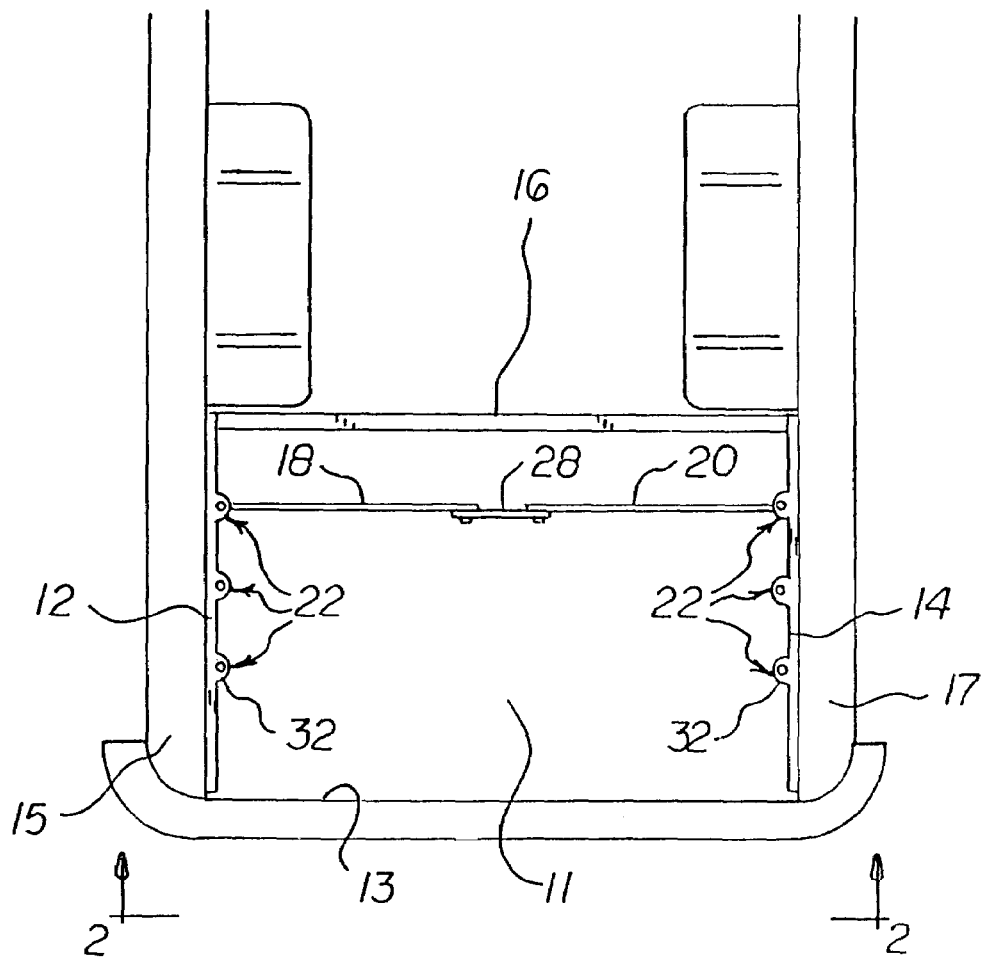
FIG. 1 is a top view showing a first embodiment of the truck bed divider apparatus of the invention installed on a truck bed near the tailgate end of the truck bed.

With reference to the drawings, a new and improved truck bed divider apparatus embodying the principles and concepts of the present invention will be described.

Generally, and as shown with the embodiment in FIGS. 1–5, a truck bed divider apparatus 10 includes a first side frame member 12 connected to a first wall 15 of a truck bed 11. A second side frame member 14 is connected to a second wall 17 of the truck bed 11. Side-frame-to-side-frame spacing means are connected to the first side frame member 12 and the second side frame member 14, for spacing the first side frame member 12 and the second side frame member 14 transversely apart from each other. Transverse hinged partition means are connected between the first side frame member 12 and the second side frame member 14, wherein each of the first side frame member 12 and the second side frame member 14 includes partition-reception means.

The transverse hinged partition means include a first partition gate 18 which is hindgedly connected to the first side frame member 12 and a second partition gate 20 which is hingedly connected to the second side frame member 14.

With the embodiment of the invention shown in FIGS. 1–5, the side-frame-to-side-frame spacing means include a transverse strut member 16 is connected between the first side frame member 12 and the second side frame member 14.

More specifically with respect to the embodiment in FIGS. 1–5, the truck bed divider apparatus 10 includes a first side frame member 12, a second side frame member 14, and a transverse strut member 16 connected between the first side frame member 12 and the second side frame member 14. Transverse hinged partition means are connected between the first side frame member 12 and the second side frame member 14, wherein each of the first side frame member 12 and the second side frame member 14 includes partition-reception means. The transverse hinged partition means prevent items carried on the truck bed from moving toward the front of the truck bed away from the tailgate. The apparatus of the invention provides positioning of items carried on a truck bed to be positioned near the end of the bed, near the tailgate, so that the items are easier to reach from the tailgate end of the bed. With this embodiment of the invention, the apparatus can be installed easily on a truck bed without the need to drill holes in the truck body.

Figure 2:
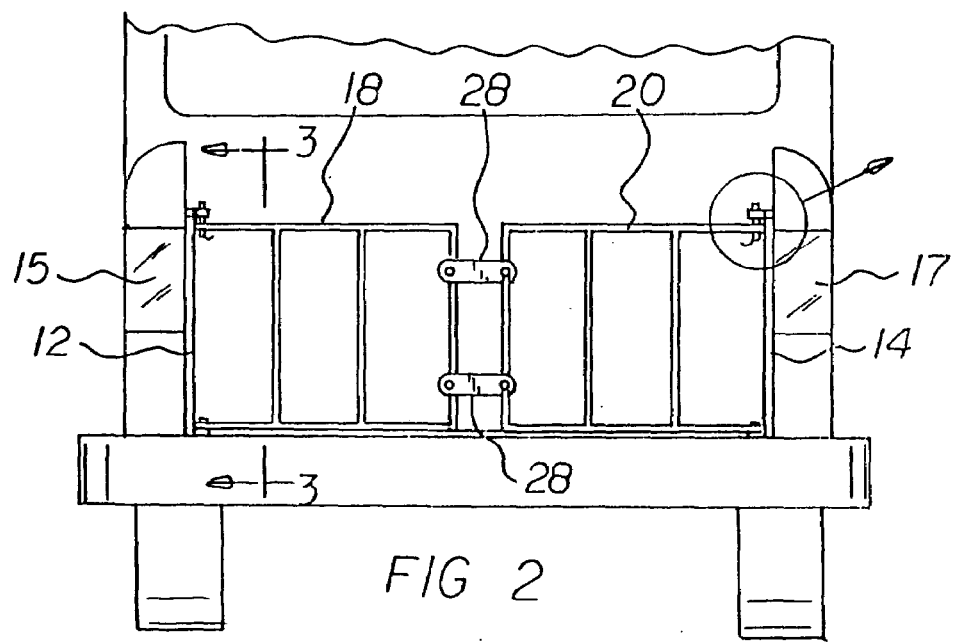
FIG. 2 is a rear view of the embodiment of the truck bed divider apparatus shown in FIG. 1 taken along line 2—2 of FIG. 1.
Figure 3:
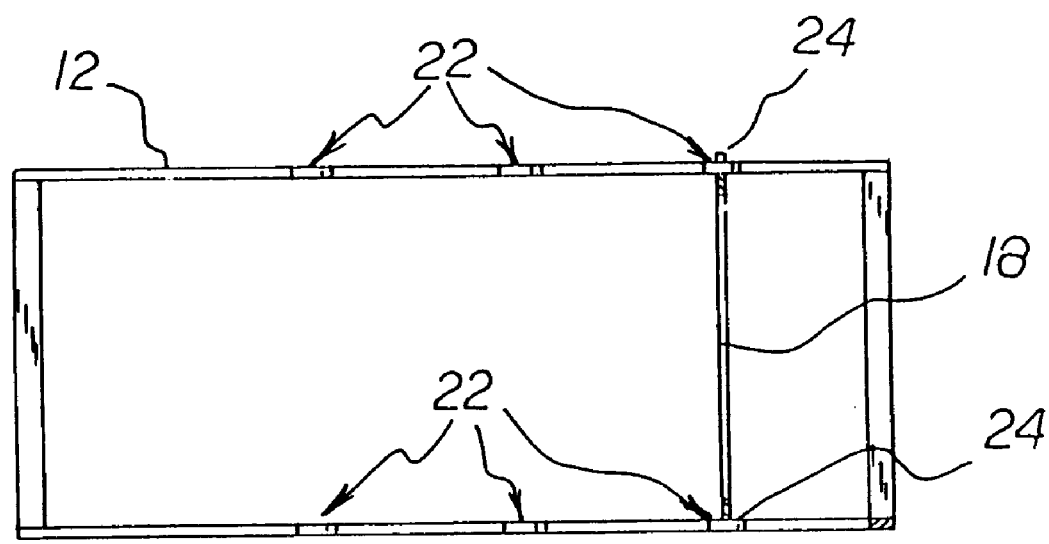
FIG. 3 is a cross-sectional view of the embodiment of the truck bed divider apparatus of FIG. 2 taken along line 3—3 thereof.
Figure 4:
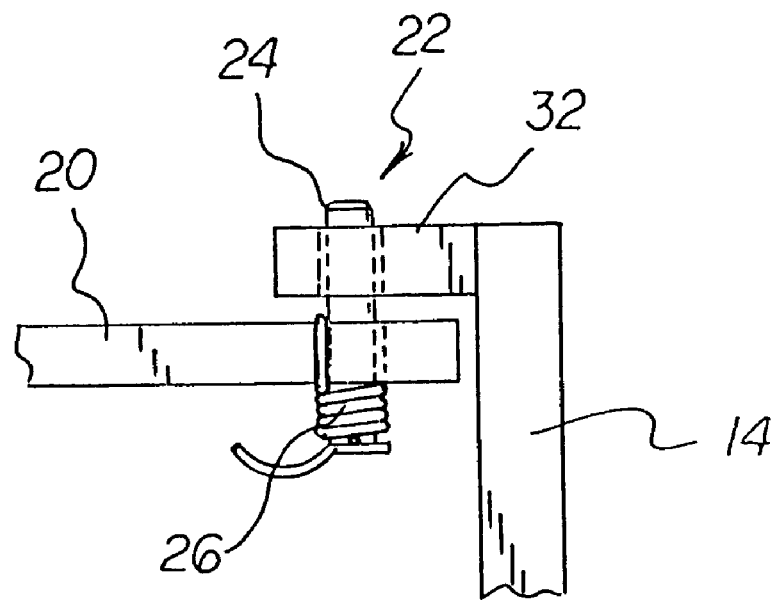
FIG. 4 is an enlarged rear view of a portion of the embodiment of the invention shown in FIG. 2 that is contained in circled area 4.

Preferably, the transverse hinged partition means include a first partition gate 18 hingedly connected to the first side frame member 12 and a second partition gate 20 hingedly connected to the second side frame member 14. Preferably, gate-to-gate locking means are provided for locking the first partition gate 18 and the second partition gate 20 together in a transverse partitioning orientation. The transverse partitioning orientation is shown in FIGS. 1–3. The gate-to-gate locking means can include latch links 28 connected between inside ends of the first partition gate 18 and the second partition gate 20. The latch links 28 are hingedly connected to the first partition gate 18, and the second partition gate 20 includes latch-reception fingers 30 for engaging the latch links 28.

With the first embodiment of the invention, the partition-reception means include hinge support flanges 32, and the gate-to-side hinges 24 are received in the hinge support flanges 32. The gate-to-side hinges 24 can include biasing springs 26. The biasing springs 26 can be configured either to normally bias the partition gates in an open, non-partitioning orientation or in a closed, transverse partitioning orientation The partition-reception means are arrayed along the respective side frame members at a plurality of partition-reception locations 22.

To use the first embodiment of the truck bed divider apparatus 10 of the invention, as shown in FIG. 1, the first side frame member 12 is placed against a first wall 15 of the truck bed 11, and the second side frame member 14 is placed against the second wall 17 of the truck bed 11. The transverse strut member 16 is secured between the first side frame member 12 and the second side frame member 14 to keep the first side frame member 12 and the second side frame member 14 firmly located against the respective truck bed walls.

Opposing partition-reception locations 22 on the First side frame member 12 and the second side frame member 14 are selected for installation thereon of the first partition gate 18 and the second partition gate 20. For a small storage space on the truck bed 11 between the partition gates and the tailgate end 13 of the truck bed 11, the partition gates are installed on the partition-reception locations 22 nearest the tailgate end 13. For a large storage space on the truck bed 11 between the partition gates and the tailgate end 13 of the truck bed 11, the partition gates are installed on the partition-reception locations 22 farthest from the tailgate end 13. For an intermediate storage space, the partition gates are installed at partition-reception locations 22 from the tailgate end 13. In this respect, the apparatus can be adjusted to position the partition gates from 10 inches, or 15 inches, or 20 inches from the tailgate end 13, respectively.

To establish a rigid transverse partition, the first partition gate 18 and the second partition gate 20 are locked together using the latch links 28. That is, the latch links 28 on the first partition gate 18 are secured to the latch-reception fingers 30 on the second partition gate 20. In this respect, the apparatus of the invention is used in a transverse partitioning orientation.

Figure 5:
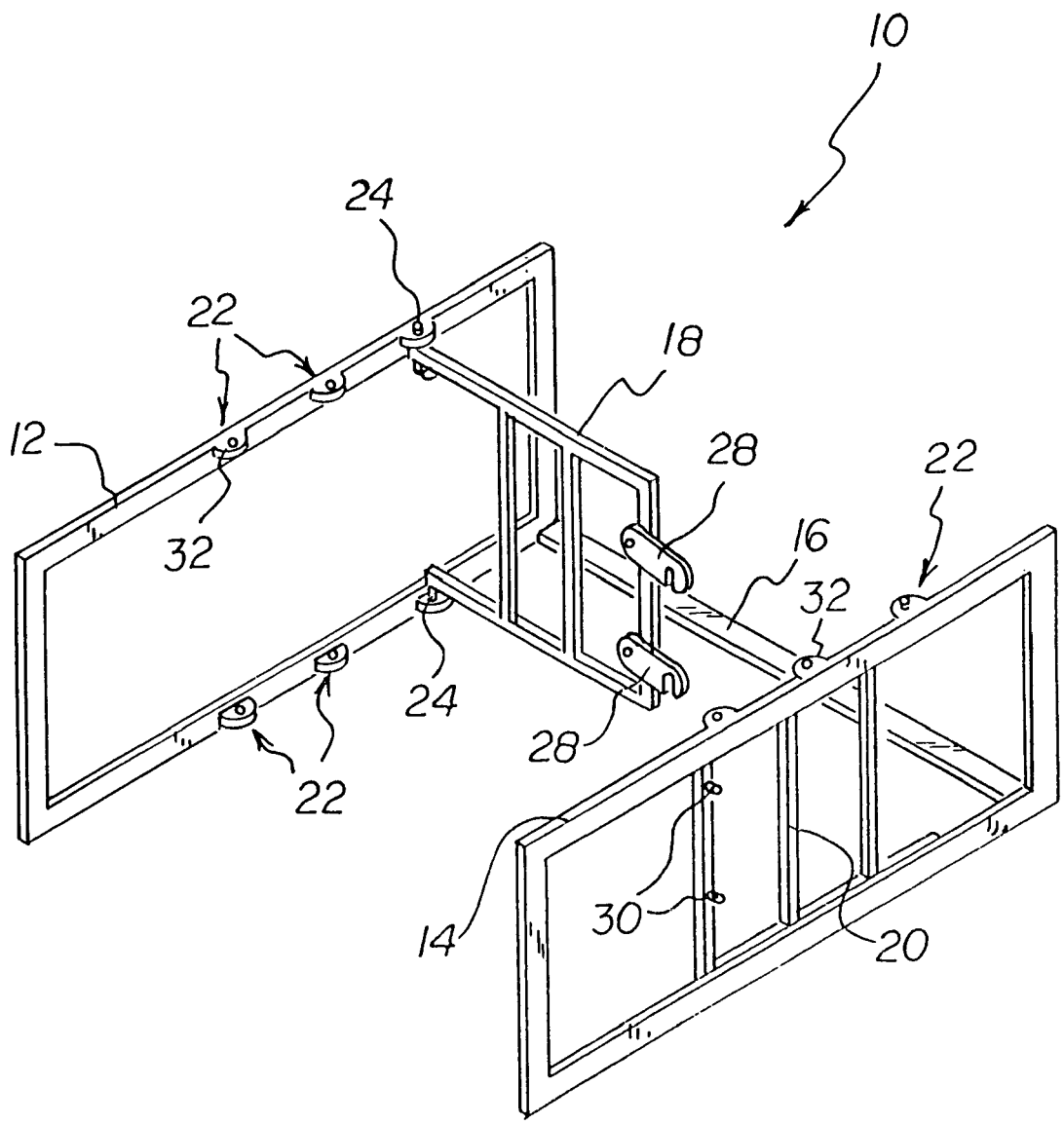
FIG. 5 is perspective view of the embodiment of the invention shown in FIGS. 1–4, removed from the truck bed.
Figure 6:
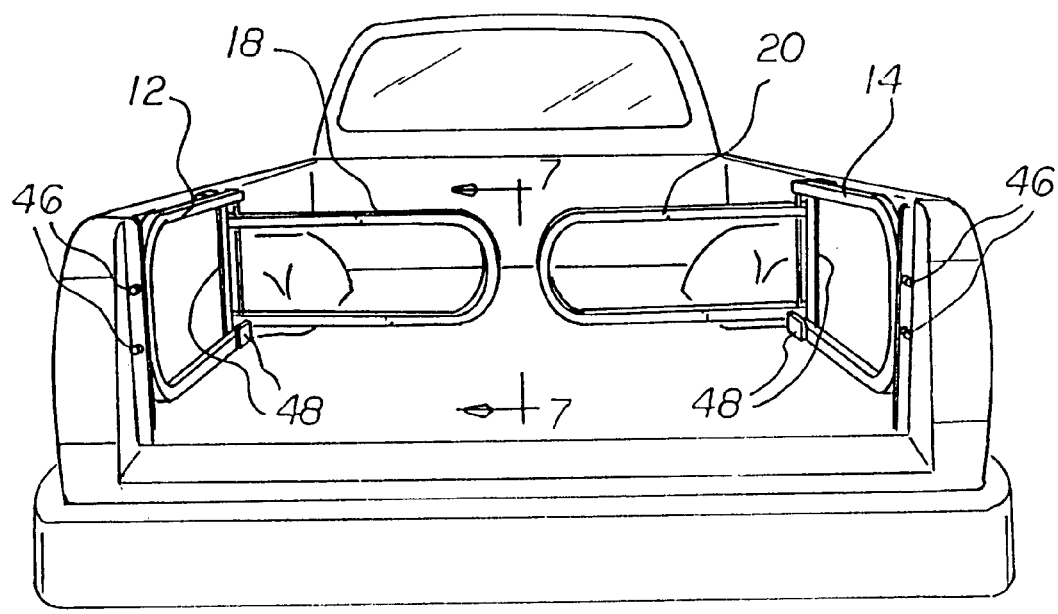
FIG. 6 is a rear perspective view of a second embodiment of the invention, wherein the first partition gate and the second partition gate are in an unfolded, extended orientation.
Figure 7:
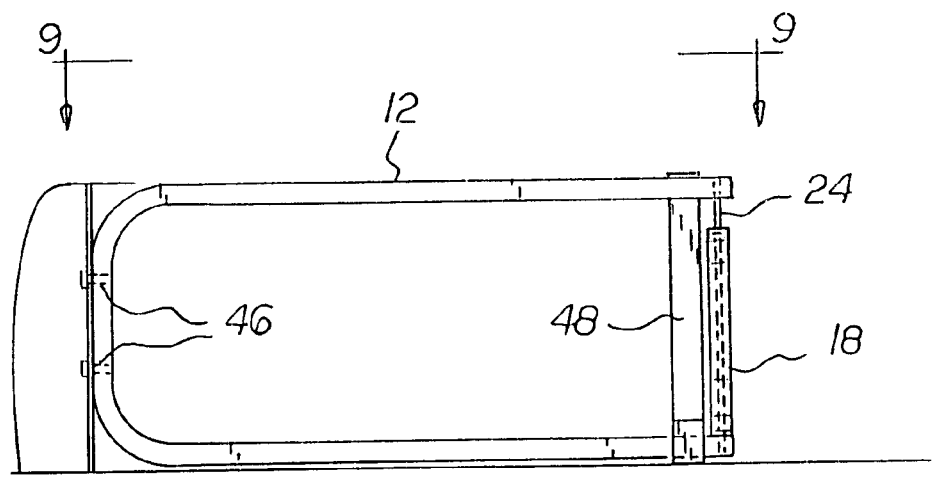
FIG. 7 is an enlarged inside view of the embodiment of the invention shown in FIG. 6, taken along line 7—7 thereof.

If the transverse partition is not needed, the latch links 28 are disengaged from the latch-reception fingers 30, and the partition gates are swing around their respective gate-to-side hinges 24 so that the partition gates are substantially parallel to the side frame members. In FIG. 5, the first partition gate 18 is serving as a transverse partition, and the second partition gate 20 has been swung around the gate-to-side hinges 24 so that the second partition gate 20 is substantially parallel to the second side frame member 14. In this respect, in FIG. 5, the first partition gate 18 is shown in the transverse partitioning orientation, and the second partition gate 20 is shown in a non-partitioning orientation. The non-partitioning orientation permits the full length of the truck bed 11 to be employed, such as when relatively long articles are carried in the truck bed 11. If desired, both the first partition gate 18 and the second partition gate 20 can be employed in the non-partitioning orientation.

The apparatus of the invention can also include locations onto which straps or bungee cords can be attached for securing cargo to the truck bed 11. The entire apparatus can be removed easily from the truck bed 11 for cleaning purposes and when loose cargo, such as sand, gravel, wood chips, and the like are to be carried on the truck bed 11.

Turning to FIGS. 6–13, a second embodiment of the invention is shown. Reference numerals are shown that correspond to like reference numerals that designate like elements shown in the other figures. In addition, the side-frame-to-side-frame spacing means include bed-wall-to-side-frame connector means which are connected between the respective side frame members and side walls of the truck bed.

The bed-wall-to-side-frame connector means include fasteners 46 which are connected between the respective side frame members and walls of the truck bed. Side-frame-to-bed-wall brackets 48 are connected between the respective side frame members and the walls of the truck bed.

Each of the respective first side frame member 12 and the second side frame member 14 includes a respective inside distal length 34 and an inside width 38. Each of the respective first partition gate 18 and the second partition gate 20 includes a respective outside distal length 36 and an outside width 40, the inside distal length 34 is greater than the outside distal length 36 and the inside width 38 is greater than the outside width 40, whereby the respective partition gates are nested with the respective side frame members when the partition gates are folded against walls of the truck bed.

Figure 12:
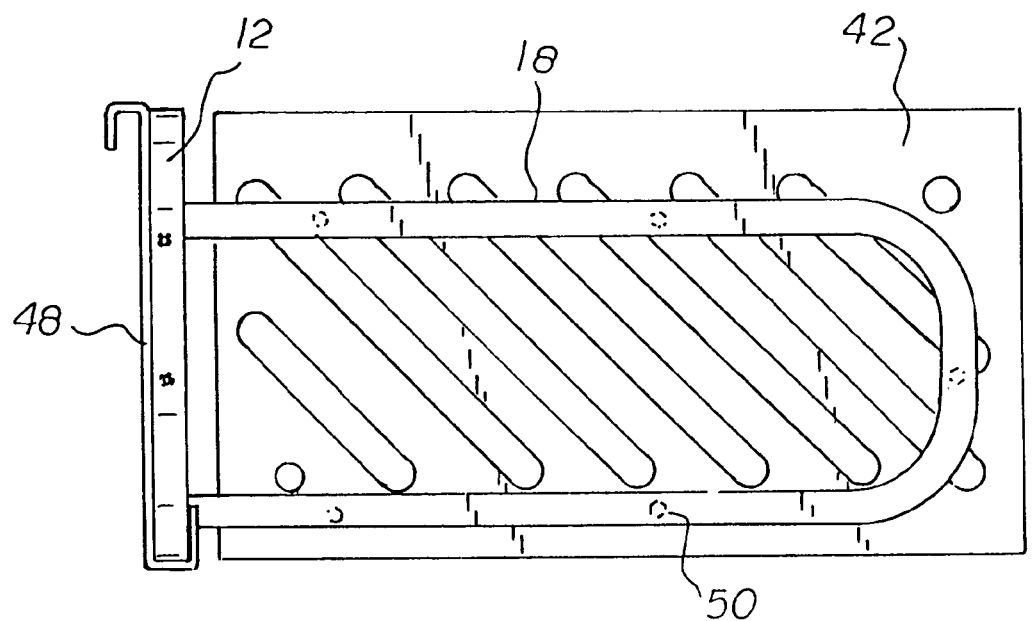
FIG. 12 is an inside view a first type of partition panel attached to a partition gate.
Figure 13:
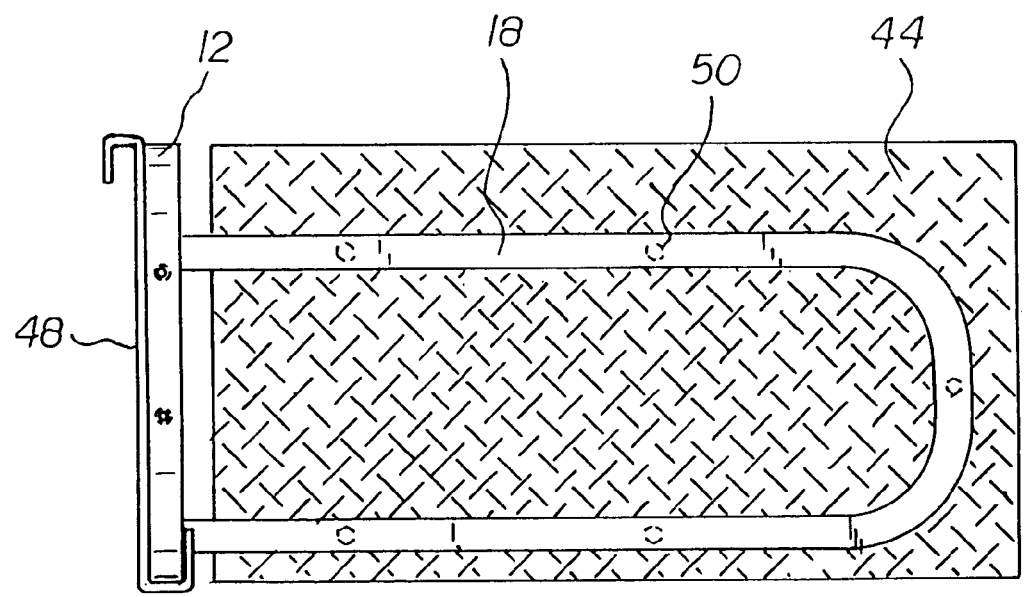
FIG. 13 is an inside view of a second type of partition panel attached to a partition gate.

As shown in FIGS. 12 and 13, respective partition panels can be attached to a partition gate, and panel-to-partition fasteners 50 are employed for attaching a partition panel to a partition gate. A first type of partition panel 42 is shown in FIG. 12, and a second type of partition panel 44 is shown in FIG. 13.

If desired, a cover (not shown) can be employed to rest upon the first wall 15 and the second wall 17 and to cover all or a portion of the truck bed 11.

To install the second embodiment of the invention, holes are drilled in the respective first and second walls 15 and 17, and fasteners 46 are used to attach the respective first and second side frame members 12 and 14 to the respective walls 15 and 17.

Figure 8:
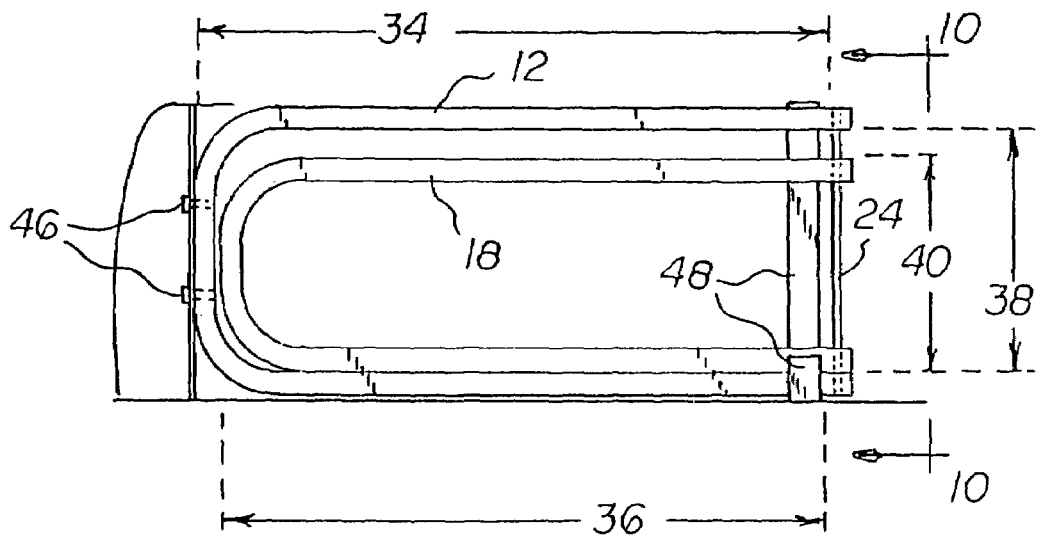
FIG. 8 is an inside view of the embodiment of the invention shown in FIG. 7, wherein the first partition gate is in a folded, nested orientation with respect to the first side frame member.

As shown in FIGS. 8, 10, and 11, when the first partition gate 18 and the second partition gate 20 are not needed for dividing the truck bed 11 into separated bed areas, the first partition gate 18 can be rotated around one of the gate-to-side hinges 24 to nest the first partition gate 18 within the first side frame member 12, against the first wall 15. Similarly, second partition gate 20 can be rotated around another gate-to-side hinge 24 to nest the second partition gate 20 within the second side frame member 14, against the second wall 17.

Figure 9:
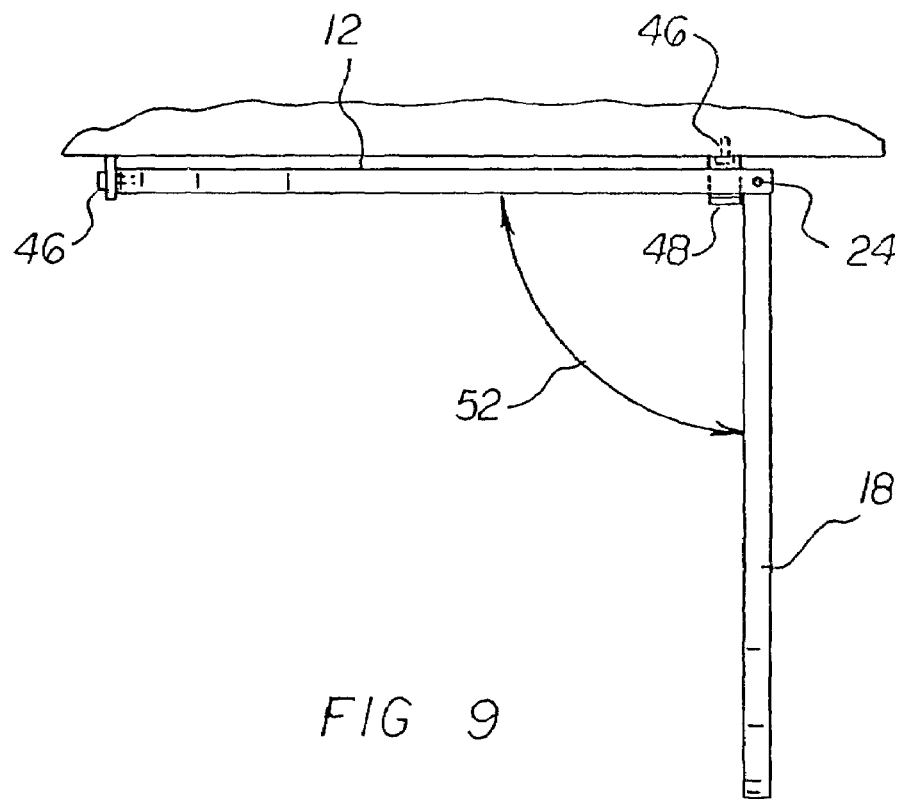
FIG. 9 is a top view of the embodiment of the invention of FIG. 7 taken along line 9—9 thereof.

On the other hand, as shown in FIG. 9, when the first partition gate 18 is used to provide a separate area on the truck bed 11, the first partition gate 18 is rotated around the gate-to-side hinges 24, as shown by rotational arrow 52, to deploy the first partition gate 18 so that it is oriented substantially perpendicular to the first side frame member 12. The second partition gate 20 is similarly deployed so that the second partition gate 20 is perpendicular to the second side frame member 14.

By the foregoing construction and arrangement of parts, the first and second partition gates 18, 20 are adapted to be raised up and/or down on hinges 24 to clear the inside upstruck bottom tab portion of bracket 48 (clearly shown in FIGS. 8–10) before the partition gates 18, 20 are rotated between their respective folded and perpendicular orientations and vice versa. In this manner, the inside upstruck bottom tab portion of each side-frame-to-bed-wall bracket 48 serves as a simple locking member maintaining the partition gates in their folded and perpendicular orientations, respectively. As will occur to those of ordinary skill, and by virtue of the aforedescribed difference between inside width 38 and outside width 40, each locking member, in turn, may easily be unlocked and subsequently locked simply by lifting or sliding each partition gate upwardly on its hinge 24 before rotating same to another orientation and then allowing the partition gate to slide downwardly on hinge 24 to a rest position.

The truck bed divider apparatus 10 of the invention can be installed in the truck bed 11 in a number of ways. With all of the embodiments shown in the drawing figures, the respective gate-to-side hinges 24 are positioned adjacent to wheel wells in the truck bed 11. That is, the gate-to-side hinges 24 are positioned away from the tailgate and toward the front of the truck bed 11. With these embodiments, the deployment of the first partition gate 18 and the second partition gate 20 provides a separated area between the deployed partition gates and the tailgate.

Alternatively, the gate-to-side hinges 24 can be positioned adjacent to the tailgate. In this respect, the tailgate of the truck can left in the down position, and the deployed first partition gate 18 and second partition gate 20 can serve as a substitute tailgate to keep items in the truck bed 11 with the tailgate down.

The components of the apparatus of the invention can be made from a wide variety of materials. An especially desirable material can be aluminum which is anodized to prevent oxidation.

The components of the truck bed divider apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved truck bed divider apparatus that is low in cost, relatively simple in design and operation, and which may advantageously be used to optimize utilization of floor space on a truck bed surface. With the invention, a truck bed divider apparatus is provided which helps optimize utilization of the already existing floor space on a truck bed surface. With the invention, a truck bed divider apparatus is provided which can be used to divide existing floor space on a truck bed surface into separate areas. With the invention, a truck bed divider apparatus is provided which enables rapid partitioning of the truck bed surface into separated areas and permits rapid return to use of the full truck bed surface as one single area. With the invention, a truck bed divider apparatus is provided which permits rapid retrofitting of a conventional truck bed to one that permits rapid transitioning from a single truck bed surface area to a truck bed surface area that is divided into separated surface areas. With the invention, a truck bed divider apparatus is provided which can be easily removed from a truck bed. With the invention, a truck bed divider apparatus is provided which does not require drilling holes or otherwise permanently damaging the walls adjacent to the truck bed for installation of the device. With the invention, a truck bed divider apparatus is provided which permits easy folding up of the device when not needed and easy unfolding of the device when needed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A truck bed divider apparatus, comprising:
   a first side frame member connected to a first wall of a truck bed,
   a second side frame member connected to a second wall of the truck bed,
   transverse hinged partition means connected between said first side frame member and said second side frame member, and
   wherein each of said first side frame member and said second side frame member includes partition-reception means,
   wherein said transverse hinged partition means include:
   a first partition gate hingedly connected to said first side frame member, and
   a second partition gate hingedly connected to said second side frame member, and
   wherein:
   each of said respective first side frame member and said second side frame member includes a respective inside distal length and an inside width,
   each of said respective first partition gate and said second partition gate includes a respective outside distal length and an outside width, and
   said inside distal length is greater than said outside distal length and said inside width is greater than said outside width, whereby said respective partition gates are nested with said respective side frame members when said partition gates are folded against each respective one of said walls of the truck bed.

2. The apparatus of claim 1 wherein said partition-reception means include hinge support flanges and gate-to-side hinges received in said hinge support flanges.

3. A truck bed divider apparatus, comprising:
   a first side frame member connected to a first wall of a truck bed,
   a second side frame member connected to a second wall of the truck bed,
   transverse hinged partition means connected between said first side frame member and said second side frame member, and
   wherein each of said first side frame member and said second side frame member includes partition-reception means,
   wherein said transverse hinged partition means include:
   a first partition gate hingedly connected to said first side frame member, and
   a second partition gate hingedly connected to said second side frame member, said apparatus further including:
   side-frame-to-bed-wall brackets connected between said respective side frame members and the walls of the truck bed, and
   locking means for locking said first partition gate and said second partition gate in a transverse partitioning orientation,
   wherein said locking means include portions of said brackets,
   wherein said locking means include bottom upstruck portions on said brackets adapted to engage said first and second partition gates, respectively, when said partition gates are in said transverse partitioning orientation, and
   wherein each of said respective first side frame member and said second side frame member includes a respective inside distal length and an inside width,
   each of said respective first partition gate and said second partition gate includes a respective outside distal length and an outside width, and
   said inside distal length is greater than said outside distal length and said inside width is greater than said outside width, whereby said respective partition gates are nested with said respective side frame members when said partition gates are folded against each respective one of said walls of the truck bed, and
   wherein said bottom upstruck portions on said brackets are adapted to be rotatably avoided by said first and second partition gates by elevating said first and second partition gates within said side frame members, respectively.

* * * * *